United States Patent Office 3,664,660
Patented May 23, 1972

3,664,660
DEVICE FOR FEEDING FLAT OBJECTS TO A PROCESSING MACHINE
Kurt Runzi, Kusnachterstrasse 59, Zumikon, Switzerland
Continuation-in-part of application Ser. No. 784,594, Dec. 18, 1968. This application Apr. 28, 1970, Ser. No. 32,525
Claims priority, application Switzerland, Dec. 20, 1967, 18,064/67
Int. Cl. B65h 3/04
U.S. Cl. 271—35
6 Claims

ABSTRACT OF THE DISCLOSURE

To feed stacked flat objects of varying size and/or thickness such as paper or carton sheets, newspapers, periodicals, printed matter envelopes or the like which are to be addressed in an addressing machine or otherwise processed, conveyor belts are located in frictional contact with the lowermost object of the stack. Two or more stop members, displaceable in lateral direction form, with the belt, a feed gap. The lower part of the abutment surfaces of the stop members are inclined relative to the vertical in transport direction. A vertically adjustable feed gap member having a curved gate surface, and a driven separator roller therebelow form, at the lowest point of the gate member, a feed passage. They are located laterally offset with respect to the stop members. Switch means are located beyond the gate to interrupt movement of the belts after an object has passed the gap.

---

The invention relates to an improved device for feeding flat objects, and more particularly objects made of paper or carton to a processing machine.

The present application is a continuation-in-part application of my patent application, Ser. No. 784,594, filed Dec. 18, 1968, abandoned.

The separation of flat objects which are stacked frequently presents substantial difficulties. Although feeding mechanisms are already known for printing presses, in which the top sheet is withdrawn from a stack, usually by suction devices, these mechanisms are only suitable for supplying thin individual sheets. However, if periodicals, printed matter, envelopes, or the like are to be addressed or otherwise processed, separation has hitherto been rather complicated and required a large amount of manual labour.

Accordingly, it is a primary object of the present invention to provide an improved device for automatically feeding flat objects to thus eliminate the need for individual manual separating the objects from a stack so that it is possible to achieve a substantially higher production speed than was previously possible with manual separation.

Another object of the subject invention is the provision of a device or an apparatus for separating flat objects ranging from single sheets of thin paper to bulky periodicals or objects having varying thickness, which may change, for example with periodicals, from one issue to another.

Yet a further object of the present invention relates to an improved device or mechanism which is relatively simple in construction, operates without malfunctions and is extremely reliable in operation.

A further object of the invention relates to an improved device for separating objects which enables quick changes to other format.

It is another object of the present invention to provide means for easily adapting the device to existing machines such as addressing machines.

Figure 1:
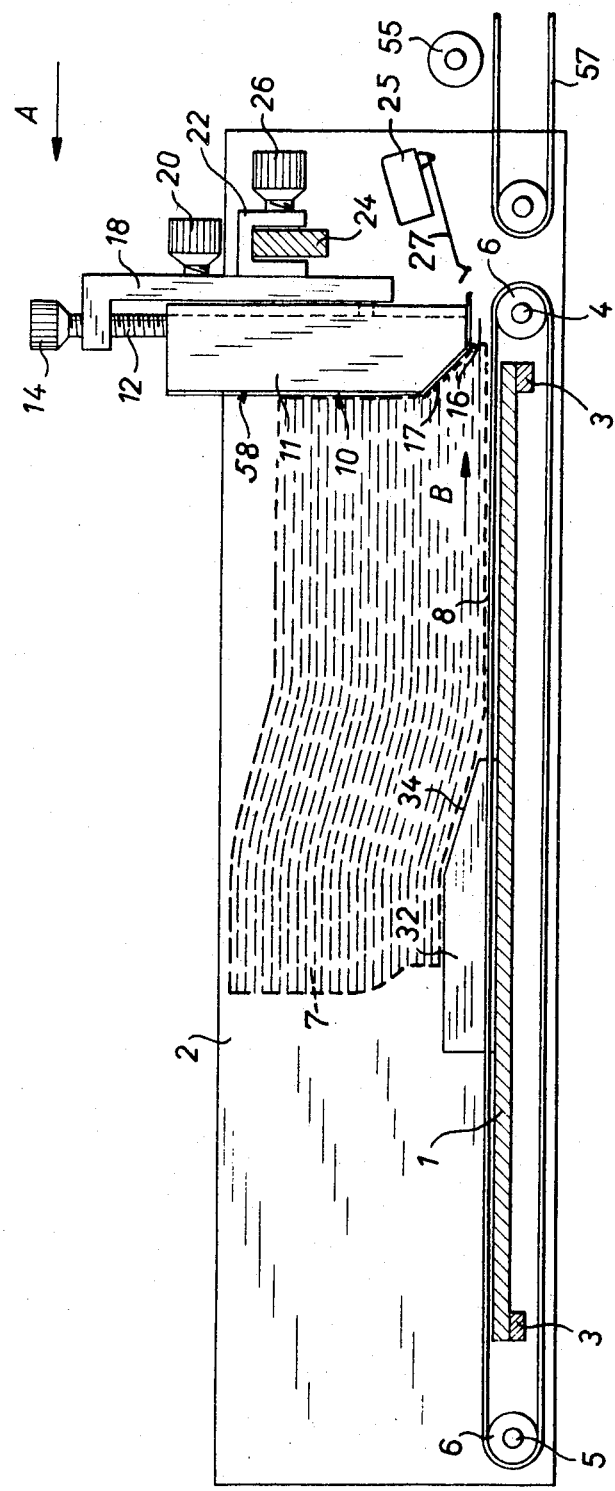
Figure 2:
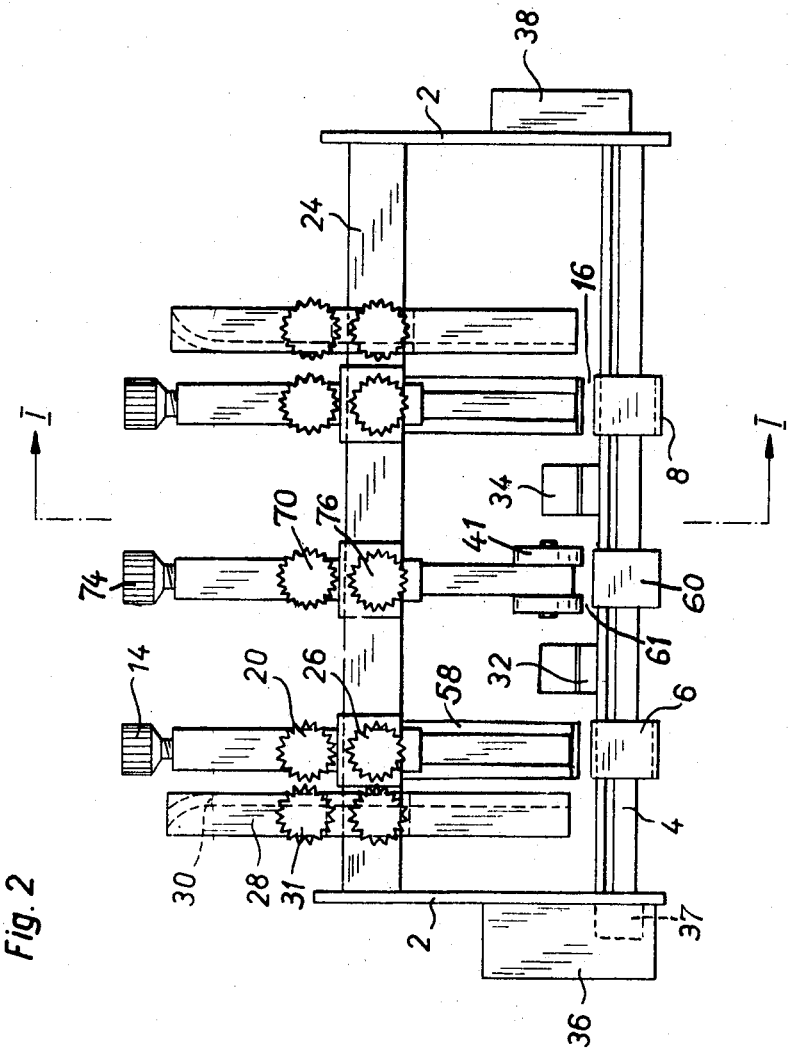
Figure 3:
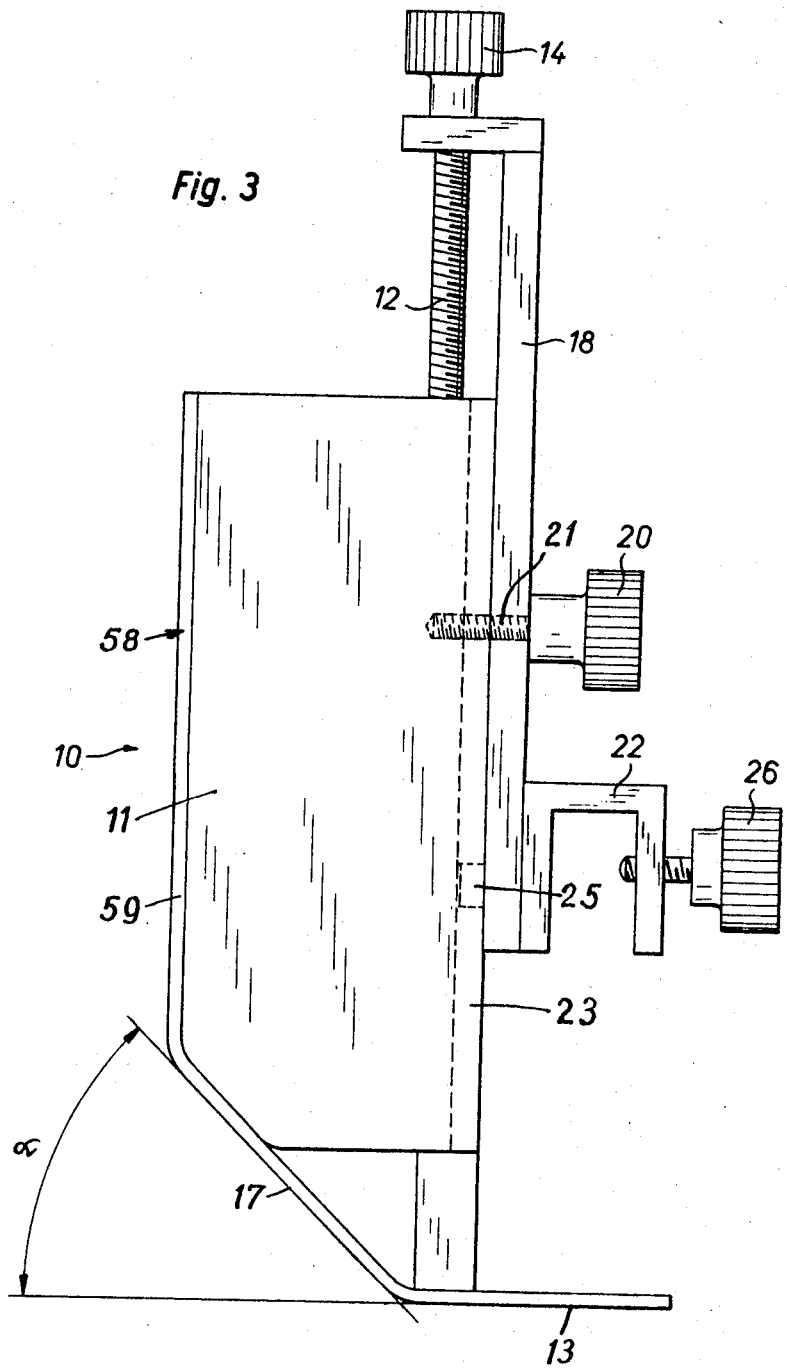
Figures 4, 5:
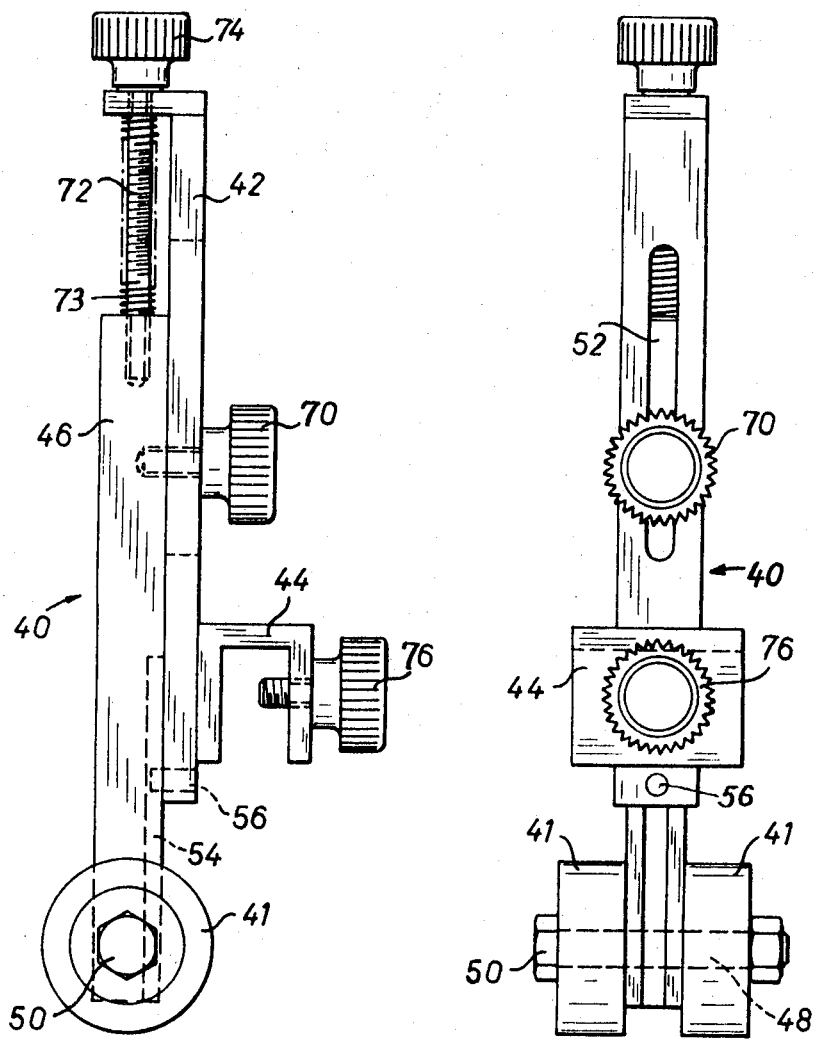

The invention will be better understood, and objects other than those set forth above will become apparent, when consideration is given to the following detailed description thereof. Such description makes reference to the annexed drawings, wherein:

FIG. 1 is a cross-section of the device along the line I—I in FIG. 2;
FIG. 2 is an elevation of the device, viewed in the direction of the arrow A in FIG. 1;
FIG. 3 is a view of an embodiment of a single retaining finger;
FIG. 4 is a side elevation of the feed gate;
FIG. 5 is a front view of the feed gate.

The device or apparatus comprises a horizontal table 1 or support member, provided on both sides with vertical side plates 2. The spacing between the side plates 2 is effected by cross-members 3 arranged under the table 1 and by a bar 24. The two side plates 2 serve also for supporting a forward shaft 4 and a rear shaft 5, each of which is connected firmly with reversing rollers 6. Two endless bands or conveyor belts 8 pass around these reversing rollers 6 in such a manner that the upper run is located immediately above the upper surface of the table 1, whilst the other run passes under the table 1. Preferably, these conveyor belts 8 consist of soft rubber or a plastic material with closed cellular structure, having a very high coefficient of friction with paper or cardboard. This coefficient of friction or the frictional resistance is substantially higher than that of steel, and preferably even higher than that of leather with reference to paper or cardboard. The embodiment shown in the drawing comprises two such belts, but a larger number may be used, and even a single, comparatively wide belt could be fitted.

A stack 8 of the objects to be separated and fed is placed on the upper run of the belts 8, as indicated in FIG. 1 by broken lines.

Above the belts and vertically above the reversing rollers 6, stop members 10 or retaining fingers are arranged, adapted to be vertically adjusted by a threaded spindle 12. Rotation of the knob 14, rigidly connected with the spindle 12, permits the adjustment of the feed gaps 16 between the conveyor belts 8 and the lower surface 13 of the stop members 10. The vertically extending body 11 of each of the two stop members 10 is mounted movably on the bar 18 and is guided by a pin 25 engaging into a groove 23, and may be fixed in the selected position by a clamping bolt 21 having a rotating knob 20. Each stop member 10, facing the stack 7, is provided with an inclined section 17, forming with the horizontal table 1 an angle α between 30° and 60°, preferably 45°. The length of the inclined section 17 is at least as long as the length of a horizontal section 13. The bar 18 is rigidly connected with a channel or U-shaped rail 22, engaging into the horizontal traverse bar 24, which is arranged between the two side plates 2. Each stop member 10 can be removed individually from the traverse bar 24 after loosening its rotary knob 26, or displaced laterally along the cross-bar 24.

As may be seen from FIG. 2, two lateral guide plates 30 are also fixed to the traverse bar 24. Between the stack 7 with the objects to be separated, is located between the guide plates 30. These guide plates 30 are connected with holders 28 and may be laterally displaced after loosening the rotary knobs 31, to adapt them to changes in the format.

The table 1 is supporting two displaceable magnetic support blocks 32, retained on the table by magnetic force. The support blocks 32 have at the front a sloping surface 34 and serve to receive a part of the weight of the stack 7.

The conveyor belts 8 are driven by an electric motor 36 through transmission means, which comprises a magnetic clutch 37 and a brake. The electrical controls are housed in a switchboard 38.

FIG. 3 shows an embodiment of a stop member 10 with a metal plate 58. This metal plate 58 contains a vertical section 58, an inclined section 17 and a horizontal lower section 13.

Referring to FIGS. 4 and 5, a feed gate 40 or barrier forms, together with a roller 60, a throat 61 so that only a single object or item at a time can pass. A vertical body 46 is mounted movably along a bar 42 and is guided by a pin 56 engaging into a groove 54. The body 46 and the bar 42 may be fixed by a clamping bolt penetrating a slot 52 and having a rotating knob 70. At the lower end of the body two discs 41 are rigidly fixed at both sides of the body 46 by screw means 48, 50 so that they cannot rotate. The discs 41 are rubber-covered or made of soft rubber to cause the discs to have a high friction contact with the objects on the track. The diameter of the discs is between 1" and 1¾", preferably 1¼". The vertical position of the discs 41 can be adjusted by a spindle 72 surrounded by a spring 73 and supporting a knob 74 at the upper end. The feed gate 40 forms a unitary structure which can be mounted movably on the transverse bar 24 by a U-shaped channel 44. Fixing of the channel 44 on the bar 24 is effected by a knob 76. The feed gate 40 is arranged in the middle between the two stop members 10 above the table 1.

A mating roller 60 is fixedly mounted on the forward shaft 4 and is rotating together with this shaft 4. The roller 60 is made at least at the periphery of soft rubber or another material with a high coefficient of friction relative to paper. The axis of the roller 60 and the axis of the discs and the axis of the shaft 4 are arranged in substantially the same vertical plane which is cutting or traversing the horizontal section 13.

The operation of this feeding device is as follows: A stack 7 of objects to be treated, for example, sheets of paper or cardboard, envelopes, periodicals or folded newspapers, is placed between the two guide plates 30 so that the front part or leading edge of the stack abuts substantially against the vertical wall 41 of the stop members 10. The feed gaps 16 are then set by rotating the knob 14 of each stop member in such a manner that just one single object can pass through these feed gaps 16. The rear part of the stack 7 rests on the two laterally spaced apart blocks 32 so that the conveyor belts 8 are relieved of part of the weight of the stack 7. Since the conveyor belts 8 have an outer surface with high coefficient of friction, they tend to carry the lowermost object along by friction in the direction of the arrow B and to transport it through the gaps 16 by friction force only. However, since the gaps 16 have been adjusted and dimensioned to accept only one single object, only the lowermost object can pass therethrough. When this lowermost object has left the gaps 16, the conveyor belts 8 are stopped by means of a micro-switch or sensor switch 25 or a photoelectric cell acting on the electro-magnetic clutch 37 and a brake. The object which has passed the gaps 16 and the throat 61 is engaged by transport belts 57 and a conveying roller 55. The speed of the transport belt 57 is slightly higher than that of the conveyor belts 8. Due to this difference in speed, an interspace or gap is produced between two successively fed objects. The micro-switch 25 is arranged just behind the gaps 16—looking in feed direction—and the switching arm 27 is therefore falling into the interspace, so that the movement of the belt 8 is interrupted behind each object which has passed the gaps 16 at the full length. This single object, which has now been separated from the stack 7 can be processed or treated by a machine, for example, be addressed in an addressing machine or otherwise treated and is then removed by further transport members, not shown in the drawing. This further transport of the treated objects may be effected either in the direction of the arrow B or transversely thereto. Preferably, the impulse for re-engaging the electro-magnetic clutch for driving the conveyor belts 8 is derived from the addressing machine or other processing machine in accordance with its operating rhythm. This process is repeated until the whole stack 7 has been separated in this manner. The stack 7 can be replenished from time to time from the top by an operator.

The whole device is constructed as a transportable unit, adapted to be placed on a machine table, which may be fitted and removed as one whole independent unit.

It would also be possible to incline the whole device in such a manner that several devices can be stepwise arranged.

It should be apparent from the foregoing detailed description that the objects set forth at the outset to the specification have been successfully achieved. Accordingly,

What is claimed is:

1. A device for feeding flat objects such as paper sheets, cardboard pieces or periodicals to a processing machine, such as an addressing machine, sequentially out from a stack of such objects, said device comprising:

at least two endless conveyor belts positioned in substantially horizontal alignment, spaced from each other and being in frictional contact with the lowermost object of said stack;

each of said endless belts having an outer surface with high coefficient of friction relative to said objects;

at least two stop members (10) located above the upper run of said belts (8) and being displaceable in lateral direction, each of said stop members having an abutment surface for said stack in front thereof and an essentially horizontal surface forming a feed gap together with one of said belts;

said stop members being adjustable in vertical direction for varying said feed gaps;

driving means for driving said conveyor belts;

at least the lower part of said abutment surface of said stop members being inclined relative to the vertical in transport direction;

at least one feed gate member (40) having a curved gate surface (41), and a driven separator roller (60) arranged below the lowest point of said curved gate surface of said feed gate member (40) defining a feed passage (61) therebetween for passage of only one object at a time, said feed gate member being adjustable in vertical direction for varying the gap of said feed passage (61);

said feed gate member (40) and separator roller (60) being located laterally, with respect to feed direction, of at least one of the stop members;

two laterally displaceable guide plates (30) for receiving said stack (7) therebetween;

to feed and separate said objects by frictional contact at the feed gaps and at the feed passage between the conveyor belts, opposite the essentially horizontal surface and said driven separator roller (60) opposite said curved surface;

and electrical switching means for interrupting the movement of said driving means depending on the position of objects having passed said gaps, said switching means being mounted beyond said stop members, with respect to feed direction, to interrupt the movement of said belt each time after one object has passed the gap.

2. A device as defined in claim 1, wherein said supporting means for the upper run of the belts comprises a table, said endless conveyor belts surrounding said table, the upper run of each of said belts being supported by said table for counterpressing partially the weight of said stack.

3. A device as defined in claim 1, including pulleys in engagement with the belts, the lowest point of said curved surface, the axis of said driven roller, and the axis of one of said pulleys being arranged substantially on a common vertical plane;

each of said stop members having a substantially horizontal section limiting the feed gaps at the upper side, said plane being so arranged that it is intersecting said horizontal section.

4. A device as defined in claim 3, wherein said curved gate surface is formed by at least one disc, and the axis of the disc lies substantially on the vertical plane.

5. A device as defined in claim 1, wherein the abutment surface of said stop members comprise an upper substantially vertical section, an inclined section defining an angle of 30° to 60° to the horizontal, and a lowermost horizontal section limiting said gaps, the length of said inclined section being at least as long as said horizontal section.

6. A device for feeding flat objects, such as paper sheets, cardboard pieces or periodicals to a processing machine, such as an addressing machine, sequentially out from a stack of such objects, said device comprising:

a horizontal table (1);

at least two endless conveying belts (8) surrounding said table, the upper run of said belts being close above the surface of said table;

a front and a rear roller (6) supporting said conveying belts (8);

driving means (36) for driving said conveyor belts (8);

the outer surface of said belt having a high coefficient of friction relative to said objects;

the upper run of said belts (8) being in frictional contact with the lowermost object of said stack;

at least two stop members (10) located above said front roller, said stop members being adjustable in vertical direction;

the lower end of each of said stop members forming together with said belt a gap permitting passage of only one object at a time, said stop member (1) having an abutment surface for said stack, comprising an upper substantially vertical section (59), a lower substantially horizontal section (13) and therebetween an inclined section (17);

two laterally displaceable guide plates for receiving said stack therebetween;

electrical switching means (25) with a switching arm (27) for interrupting the movement of said driving means (36) depending on the position of separated objects, said switching arm (27) being arranged to sense objects beyond said gap (16) in direction of feed;

at least one feed gate member (40) having a curved gate surface (41);

a driven separating roller (60) arranged below said feed gate member (40) defining together a feed passage (61) therebetween for passage of only one object at a time, said feed gate member being adjustable in vertical direction for varying said feed passage (61);

the axis of said front roller (6), the horizontal section (13) of said stop members (10) respectively, the axis of said separating roller (60) and the lowest point of the curved gate surface (41) being arranged in a common substantially vertical plane.

References Cited

UNITED STATES PATENTS

| | | | |
|---|---|---|---|
| 1,011,820 | 12/1911 | Labombarde | 271—35 |
| 1,948,362 | 2/1934 | Staude | 271—35 |
| 2,110,980 | 3/1938 | Swift | 271—35 |
| 3,322,602 | 5/1967 | Schneider | 271—35 |
| 1,097,641 | 5/1914 | Jagenberg | 271—35 |
| 856,346 | 6/1907 | Jahn | 271—35 |
| 2,343,479 | 3/1944 | Ryan et al. | 271—35 X |
| 1,159,498 | 11/1915 | Jagenberg | 271—35 |

FOREIGN PATENTS

| | | | |
|---|---|---|---|
| 839,920 | 6/1960 | Great Britain | 271—35 |

JOSEPH WEGBREIT, Primary Examiner